(12) United States Patent
Dhanda et al.

(10) Patent No.: US 9,179,303 B2
(45) Date of Patent: Nov. 3, 2015

(54) METHODS AND APPARATUS FOR TRANSMITTING AND RECEIVING SECURE AND NON-SECURE DATA

(75) Inventors: Mungal Singh Dhanda, Slough (GB); Simon James Walke, Basingstoke (GB); Philip J. Children, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/294,135

(22) Filed: Nov. 10, 2011

(65) Prior Publication Data

US 2012/0137125 A1 May 31, 2012

Related U.S. Application Data

(60) Provisional application No. 61/414,629, filed on Nov. 17, 2010.

(51) Int. Cl.
| | |
|---|---|
| *H04L 9/32* | (2006.01) |
| *H04W 12/02* | (2009.01) |
| *H04L 29/06* | (2006.01) |

(52) U.S. Cl.
CPC ........... *H04W 12/02* (2013.01); *H04L 63/0428* (2013.01); *H04L 63/08* (2013.01); *H04L 63/0884* (2013.01); *H04L 63/123* (2013.01)

(58) Field of Classification Search
CPC .............. H04L 63/0428; H04L 63/12; H04L 2463/101; H04L 63/0823; H04L 69/04; H04L 1/02; H04L 1/20; H04L 2209/34; H04L 2209/80; H04L 2209/805; H04L 63/0457; H04L 63/08; H04L 63/0884; H04L 63/123; H04L 63/162; H04L 9/08; H04L 9/32; G06F 21/606; H04W 4/02; H04W 4/14; H04W 12/02
USPC ........................... 713/150–181; 380/270, 255
See application file for complete search history.

(56) References Cited

U.S. PATENT DOCUMENTS

| | | |
|---|---|---|
| 7,415,109 B2 | 8/2008 | Rose et al. |
| 7,450,721 B2 | 11/2008 | Farnsworth et al. |

(Continued)

FOREIGN PATENT DOCUMENTS

| | | |
|---|---|---|
| KR | 20100028651 A | 3/2010 |
| WO | 2009078103 A1 | 6/2009 |

(Continued)

OTHER PUBLICATIONS

3GPP "Mobile radio interface layer 3 specification," 3GPP TS 44.018 v8.10.0, Mar. 2010, 425pp.*

(Continued)

*Primary Examiner* — Peter Shaw
*Assistant Examiner* — Don Zhao
(74) *Attorney, Agent, or Firm* — Stanton Braden

(57) ABSTRACT

Devices, methods, and systems capable of an enabling transmission and receipt of secure and non-secure data are discussed in this document. According to some embodiments, a network apparatus can transmit ciphered and unciphered data. The network apparatus transmits a first signal indicating a cipher to be used and transmits a second signal indicating that non-secure data is to be transmitted and received unciphered. The network apparatus can cipher secure data and transmits ciphered-secure data and unciphered-non-secure data. A wireless terminal can receive the first and second signals, the ciphered secure data, and the unciphered non-secure data. The wireless terminal can deciphers the received secure data and does not decipher the received non-secure data. System embodiments can include both network-side and network terminal components. Embodiments of the present invention enable secure transmission of data in concert with efficient processing. Other aspects, embodiments, and features are also claimed and described.

35 Claims, 11 Drawing Sheets

(56) References Cited

U.S. PATENT DOCUMENTS

| | | | |
|---|---|---|---|
| 7,786,902 B1* | 8/2010 | Oberg | 341/50 |
| 2005/0261017 A1* | 11/2005 | Vaittinen et al. | 455/522 |
| 2008/0162929 A1 | 7/2008 | Ishikawa et al. | |
| 2008/0279381 A1* | 11/2008 | Narendra et al. | 380/270 |
| 2009/0025060 A1* | 1/2009 | Mukherjee et al. | 726/3 |
| 2009/0164803 A1* | 6/2009 | Lundvall et al. | 713/190 |
| 2010/0067440 A1* | 3/2010 | Dick et al. | 370/328 |
| 2010/0180118 A1 | 7/2010 | Nakatsugawa | |
| 2010/0190469 A1 | 7/2010 | Vanderveen et al. | |
| 2010/0322426 A1 | 12/2010 | Keevill et al. | |
| 2012/0093314 A1* | 4/2012 | Jokinen et al. | 380/270 |

FOREIGN PATENT DOCUMENTS

| | | |
|---|---|---|
| WO | WO 2010021764 A1 * | 2/2010 |
| WO | WO-2010088428 A1 | 8/2010 |

OTHER PUBLICATIONS

International Search Report and Written Opinion—PCT/US2011/060437—ISA/EPO—Feb. 14, 2012.
Chapter II Demand and Article 34 Amendment With Response to Written Opinion—Aug. 24, 2012.
International Preliminary Examing Authority—Notification of Transmittal of the Internation Preliminary Report on Patentability—Oct. 26, 2012.
Taiwan Search Report—TW100141903—TIPO—Jan. 14, 2014.
ETSI TS 144 018 V10.4.0 (Oct. 2011) "Digital cellular telecommunications system (Phase 2+); Mobile radio interface layer 3 specification; Radio Resource Control (RRC) protocol", (3GPP TS 44.018 version 10.4.0 Release 10), [online], Oct. 2011, pp. 86-88, Internet, <URL, http://www.etsi.org/deliver/etsi_ts/144000_144099/144018/10.04.00_60/ts_144018v100400p.pdf>.
Geran WG2: "LS on SACCH Security", 3GPP Draft, G2-100389, 3rd Generation Partnership Project (3GPP), Mobile Competence Centre ; 650, Route Des Lucioles, F-06921 Sophia-Cedex, France,Antipolis vol. SA WG3, No. Sorrento, Nov. 3, 2010, 2 Pages, XP050464617.
Nokia Corporation: "On Removing SACCH Ciphering", 3GPP Draft, GP-1 01787, 3rd Generation Partnership Project (3GPP), Mobile Competence Centre, 650, Route Des Lucioles, F-06921 Sophia-Antipolis vol. TSG GERAN, No. San Jose del Cabo; 20101122, Nov. 16, 2010, 4 Pages, XP050486069.

* cited by examiner

METHODS AND APPARATUS FOR TRANSMITTING AND RECEIVING SECURE AND NON-SECURE DATA

CROSS-REFERENCE TO RELATED APPLICATION & PRIORITY CLAIM

This application is related to and claims priority to and the benefit U.S. Provisional Application No. 61/414,629, filed 17 Nov. 2010, which is hereby incorporated by reference herein for all purposes as if fully set forth below in its entirety.

TECHNICAL FIELD

Embodiments of the present invention relate generally to communication devices, systems, and methods, and more particularly to devices, methods, and systems capable of an enabling transmission and receipt of secure and non-secure data.

BACKGROUND

Generally, communications systems can help protect users data privacy by encrypting data signals. For example, data signals can be encrypted prior to being transmitted and can be decrypted by receiver equipment. As another example, internet data, such as streaming video or voice can be encrypted to prevent unauthorized users from gaining access to the data. Also, in a communications system, voice signals can be encrypted to provide users with privacy. Varying encryption techniques are known and are sometimes defined in various standards, including wired and wireless communication system standards.

Encryption or ciphering is used to encrypt information for the purpose of providing better security or confidentiality of the information. Ciphering helps to prevent unauthorised access to the information by anyone other than an intended recipient; typically, ciphering can be implemented via a ciphering algorithm. Information is usually ciphered by means of a ciphering code prior to being transmitted as data in a signal. Associated with a ciphering code is a ciphering key. Ciphered information can only be obtained from the transmitted signal by use of a corresponding deciphering key and an associated deciphering code. In some systems the ciphering key is the same as the deciphering key. Ciphering is used in all manner of applications where security of information is desired, for example communication over the internet.

While ciphering algorithms offer a degree of security, it is nevertheless possible to break a cipher. This is usually done by training, or repeatedly adapting, an algorithm to make iterative or repeated attempts to determine the deciphering key, each time varying the code according to the result of the previous attempt so as to obtain a better result. This is done until the result converges on the correct deciphering key. While breaking ciphers is computationally intensive, the availability of cheap computing power in recent years has meant that the ability to breaking such ciphers is now within the reach of many people. This poses a significant security risk to individuals and organisations that require sending or receiving secure data.

Current wireless communication systems normally operate so that data may be sent either ciphered (according to a ciphered mode of operation) or unciphered (according to an unciphered mode of operation). During the ciphered mode, both secure data (e.g. user data sent on a traffic channel) and non-secure data (e.g. control data sent on a control channel), are ciphered using the same ciphering key. Ciphering both secure data and non-secure data in this fashion may present a security risk to user data. Minimising a repetition rate for repeated data while potentially helpful, likely does not completely provide fully secured communication systems.

Embodiments of the present invention are believed to address the above-discussed issues as well as others. Thus, embodiments of the present invention are provisioned to enable and provide devices, methods, and systems capable of an enabling transmission and receipt of secure and non-secure data between communication system components.

BRIEF SUMMARY OF SOME EXEMPLARY EMBODIMENTS

The full scope of varying embodiments of the present invention is defined by claims appearing at the end of this document. To help quickly preview readers to varying features, exemplary embodiments are summarized below and are also discussed in detail below. Certain exemplary embodiments are discussed in detail, but again, the claims set forth the full scope of the varying embodiments of the present invention.

Some embodiments can include a network that can effectively command a wireless terminal to use a particular mode by transmitting an indication of a ciphering mode in which secure and non-secure data is selectively ciphered. The wireless terminal may receive the indication and may disable deciphering for data sent over a non-secure channel. This feature provides a major reduction in processing in the mobile station and increased security of secure data when the non-secure data is unciphered and secure data is ciphered. The network may dynamically control ciphering of non-secure data on the uplink and/or the downlink.

Some embodiments can be directed to a network apparatus in which secure and non-secure data may be transmitted in any one of a number of ciphering modes. Such a network apparatus can generally comprise a source of secure data; a source of non-secure data; a cipher; and a transmitter. The cipher can be coupled to the source of secure data and the source of non-secure data. The cipher can operate in a number of different ciphering modes in which the secure data and the non-secure data are selectively ciphered. The transmitter can be coupled to the cipher for transmitting an indication of the ciphering mode in which the secure and non-secure data is selectively ciphered and transmitting the selectively ciphered secure data and non-secure data.

Other embodiments can include wireless terminals/apparatuses in which secure and non-secure data may be received in any one of a number of different ciphering modes. Such devices can generally including a receiver, a deciphering module, and a decoder. The receiver can receive an indication of the ciphering mode in which secure data and non-secure data are selectively ciphered and for receiving selectively ciphered secure and non-secure data. The deciphering module can be coupled to the receiver for selectively deciphering the received selectively ciphered secure data and non-secure data according to the indicated ciphering mode to produce deciphered secure and non-secure data. The decoder can decode the deciphered secure and non-secure data.

Some embodiments can include a method in which secure and non-secure data may be transmitted in any one of a number of ciphering modes. Method embodiments can comprise providing a source of secure data and a source of non-secure data (some method embodiments may not include provisioning of such sources only receiving data from such sources). Method embodiments can also include selectively ciphering the secure data and the non-secure data according to one of a number of different ciphering modes to produce selectively ciphered secure data and non-secure data. Method embodiments can also include transmitting an indication of the ciphering mode in which the secure and non-secure data is selectively ciphered. Also, method embodiments can include transmitting the selectively ciphered secure data and non-secure data.

Still yet other method embodiments can include receiving secure and non-secure data in any one of a number of different ciphering modes. Such methods can include one or more of the following: receiving an indication of the ciphering mode in which secure data and non-secure data are selectively ciphered; receiving selectively ciphered secure and non-secure data to produce received selectively ciphered secure data and non-secure data; selectively deciphering the received selectively ciphered secure data and non-secure data according to the indicated ciphering mode to produce deciphered secure and non-secure data; and/or decoding the deciphered secure and non-secure data.

Embodiments can also include a communication system comprising a plurality of wireless communication apparatuses configured to communicate with at least one other wireless communication apparatus. Within such a system an apparatus can generally comprise a cipher and a transmitter. The cipher can be configured to selectively determine a ciphering mode in which secure and non-secure data is selectively ciphered. The cipher can be configured to receive secure and non-secure data from one or more data sources. The transmitter can be coupled to the cipher for transmitting an indication of the ciphering mode in which the secure and non-secure data is selectively ciphered and transmitting the selectively ciphered secure data and non-secure data.

Still yet additional embodiments can include a communication system comprising a plurality of wireless communication apparatuses configured to communicate with at least one other wireless communication apparatus. Within such a system, an apparatus can include a receiver and a deciphering module. The receiver can be configured to receive an indication of a ciphering mode in which secure data and non-secure data are selectively ciphered and for receiving selectively ciphered secure and non-secure data. The deciphering module can be coupled to the receiver for selectively deciphering the received selectively ciphered secure and non-secure data according to the indicated ciphering mode to produce deciphered secure and non-secure data.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE FIGURES

Further features and advantages of the various embodiments of the present invention will become clearer from consideration of the following detailed description which is provided in context with the accompanying drawings, in which.

DETAILED DESCRIPTION OF ALTERNATIVE & EXEMPLARY EMBODIMENTS

Figure 1:
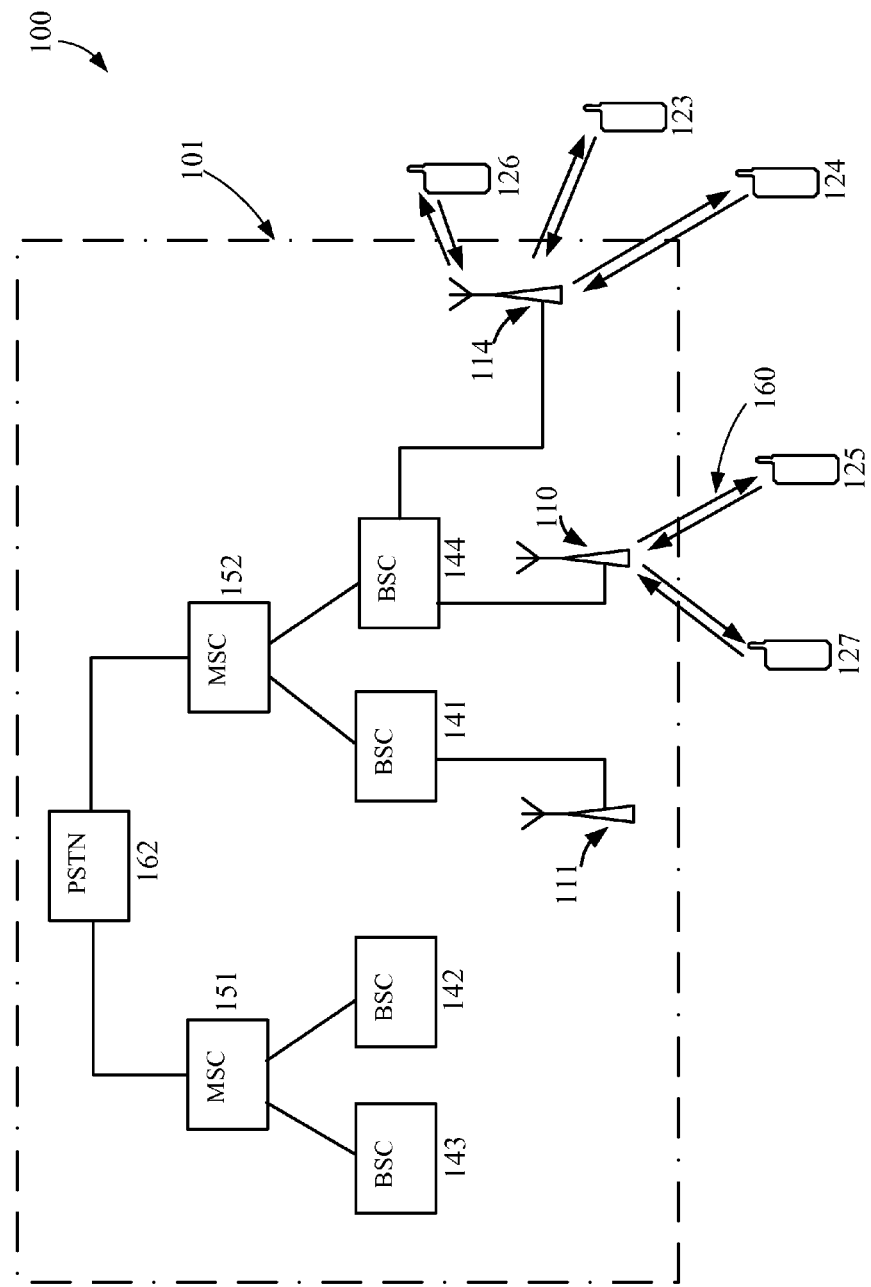
FIG. 1 is a schematic diagram of elements of a wireless cellular communication system according to some embodiments of the present invention.

FIG. 1 is a schematic diagram of elements of a wireless cellular communication system 100. The wireless cellular communication system 100 includes a network 101 comprising base stations 110, 111, 114; base station controllers 141-144; and mobile switching centres 151, 152. These components may also be referred to as network components or wireless terminals herein. The wireless communication system 100 also includes mobile stations 123-127 which are able to communicate with the base stations 110, 111, 114 via wireless links 160. A downlink signal is transmitted by a base station 110, 111, 114 of the network 101 and received by a mobile station 123-127. An uplink signal is transmitted by a mobile station 123-127 and received by a base station 110, 111, 114 of the network 101. Base stations 110, 111, 114 and mobile stations 123-127 each have a transmitter and a receiver which are used to transmit and receive signals, respectively.

The base station controllers 141-144 act to route signals carrying data to and from different mobile stations 123-127 in the same cell or in different cells. The base station controllers 141-144 can act under the control of the mobile switching centres 151, 152 to route signals. The mobile switching centres 151, 152 are connected to a public switched telephone network (PSTN) 162. Signals carrying data may be transferred between each of the mobile stations 123-127 and communications equipment of other communications networks via the public switched telephone network 162. The public switched telephone network 162 thus allows calls to be routed between the wireless communication system 100 and other communication systems. Such other communication systems include wired systems, fibre optic systems and other mobile cellular communication systems of different types and conforming to different standards.

Figure 2:
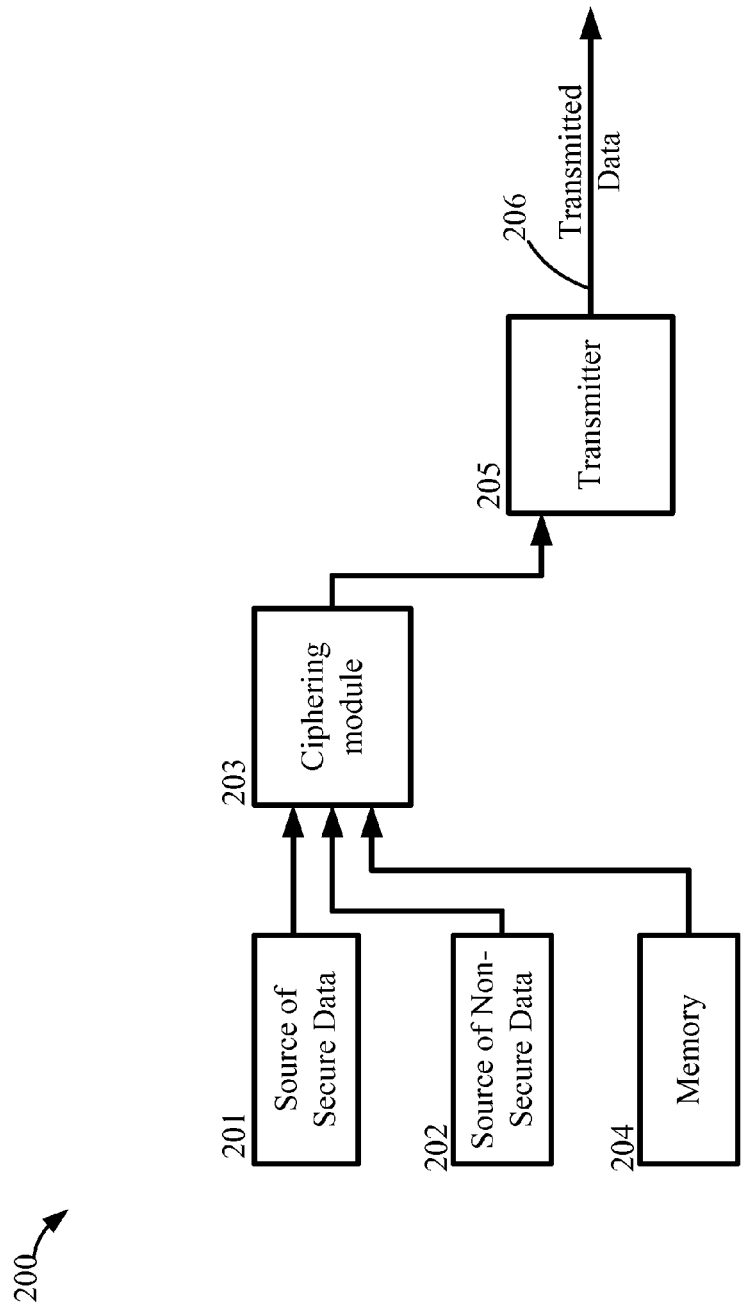
FIG. 2 is a schematic diagram of a network apparatus for use in a network of a wireless communication system according to some embodiments of the present invention.

FIG. 2 is a schematic diagram of a network apparatus 200 for use in a network of a wireless communication system. The network apparatus 200 may comprise a base station (110, FIG. 1). The network apparatus 200 generally comprises a source of secure data 201, a source of non-secure data 202, and a ciphering module 203. The data sources 201, 202 can be physically located in one or multiple data stores and can also be sourced by the network apparatus 200 in carrying out its network functions. The ciphering module 203 can receive the secure data and the non-secure data from the sources 201 and 202. The network apparatus can also include a memory 204; the memory 204 can store one or more ciphers for use by the ciphering module 203. Ciphers may optionally be stored in the ciphering module 203.

The ciphering module 203 is operable in any one of a number of different ciphering modes in accordance with the various embodiments of the present invention. For example, the ciphering module can selectively cipher secure data and non-secure data received from sources 201, 202. The enables multiple operating modes, including, a mode in which secure data is ciphered and non-secure data is wholly unciphered, a mode in which secure data is ciphered and non-secure data is partially ciphered, a mode in which the secure data is ciphered and the non-secure data is wholly ciphered, and/or other combinations thereof. Transmitting non-secure data wholly or partially unciphered increases the security of the communication as discussed in PCT Patent Application Publication Number WO2010/021764, published 25 Feb., 2010, which is incorporated herein by reference for all purposes as is fully set forth below in its entirety. It is currently preferred that the non-secure data be sent wholly unciphered. This can advantageously result in reduced mobile station processing and heightened security for transmitted secure data.

The ciphering module 203 generates an indication indicating which of the ciphering modes is used to cipher selectively the secure and non-secure data. The transmitter 205 acts to transmit a data signal 206 containing both the indication and the selectively ciphered secure and non-secure data. The indication and the selectively ciphered secure and non-secure data may also be transmitted in different signals, together or consecutively. Transmitting the indication prior to transmitting the selectively ciphered secure and non-secure data enables a wireless terminal receiving the indication to configure its circuits according to the indication, prior to receiving the ciphered secure and non-secure data. For example, if the indication indicates a ciphering mode in which the non-secure data is unciphered, a wireless terminal can configure its circuitry so that the ciphered secure and non-secure data that it receives is decoded without being deciphered.

When it is decided in advance that the un-secure data is not to be ciphered, the network apparatus 200 may be so configured that the source of non-secure data 202 is connected to the transmitter 205. This enables bypassing the ciphering module 203 and reducing processing overheads in the ciphering module 203. Alternatively a switch arrangement may be used to selectively connect the source of non-secure data 202 either to the ciphering module 203 or to the transmitter 205.

Figure 3:
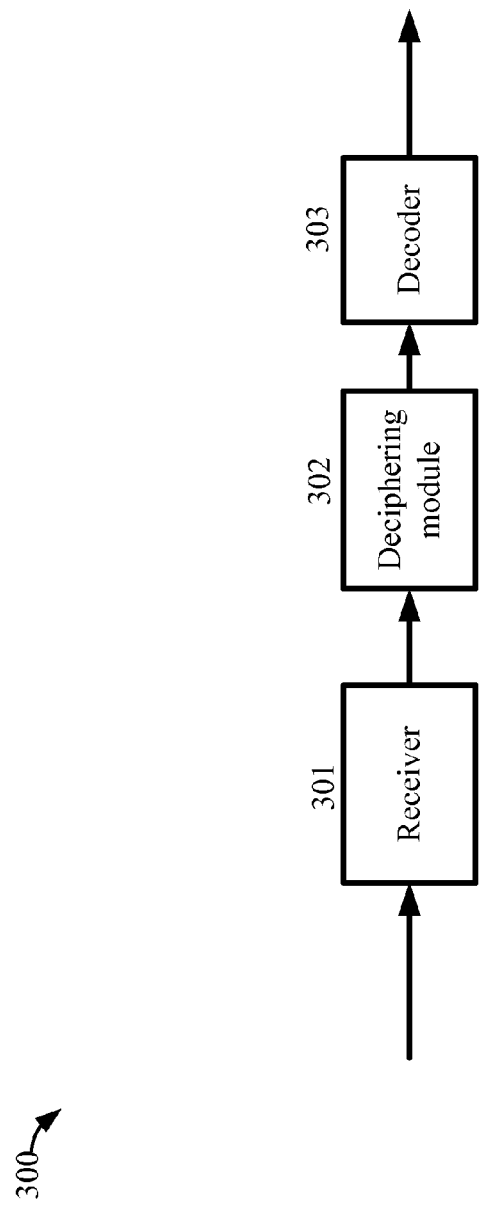
FIG. 3 is a schematic diagram of a wireless terminal apparatus of a wireless communication system according to some embodiments of the present invention.

FIG. 3 is a schematic diagram of a wireless terminal apparatus 300. The wireless terminal apparatus 300 may be a mobile station such as the mobile station 125 shown in FIG. 1 or another component of a wireless system. The wireless terminal apparatus 300 may generally comprise a receiver 301 that can receive a data signal transmitted by a base station (110, FIG. 1), such as the network apparatus 200 described above.

Data signals used with embodiments of the present invention can have varying characteristics. For example, a data signal can generally comprise a message that contains an indication of one of a number of different ciphering modes in which secure data and non-secure data are selectively ciphered (as described herein) Data signals may also comprise selectively ciphered secure and non-secure data according to a ciphering mode indicated by a received indication. An indication may indicate a ciphering mode in which the secure data is ciphered and the non-secure data is wholly unciphered, a mode in which the secure data is ciphered and the non-secure data is partially ciphered, a mode in which the secure data is ciphered and the non-secure data is wholly ciphered, and/or a combination thereof.

The receiver 301 can provide received selectively-ciphered-secure and non-secure data to a deciphering module 302. The deciphering module 302 can selectively decipher the received selectively-ciphered-secure and non-secure data. The deciphering can be done according to a received indicated ciphering mode. The deciphering module 302 can provide selectively-deciphered-secure and non-secure data to a decoder 303. If the indication indicates a mode in which the secure data is ciphered and the non-secure data is wholly unciphered, then the deciphering module 302 acts to decipher the received secure data and to provide deciphered secure data to the decoder 303 and provide the received non-secure data to the decoder 303 without deciphering the received non-secure data. The decoder 303 decodes the deciphered secure and non-secure data to produce decoded data.

When it is decided in advance that the un-secure data is not to be ciphered, the wireless terminal apparatus 300 may be so configured that the receiver 301 is connected to the decoder 303. This enables bypassing the deciphering module 302 and reducing processing overheads in said deciphering module 302. A switch arrangement may also be used to selectively connect the receiver 301 either to the deciphering module 302 or to the decoder 303.

In use, the wireless terminal apparatus 300 initially operates in unciphered mode in which data is received by the receiver 301, provided to the deciphering module 302 and output directly by the deciphering module 302 without being deciphered. The received data is decoded by the decoder 303. While the wireless terminal apparatus 300 is operating in unciphered mode, the receiver 301 of the wireless terminal apparatus 300 receives a data signal, transmitted by a base station, for example the network apparatus 200. The received data signal comprises a message comprising wholly unciphered data comprising an indication of a ciphering mode. The indication is identical to the indication transmitted by the network apparatus 200 and described above.

The receiver 301 further receives a data signal which comprises selectively ciphered secure data and non-secure data. The selectively ciphered secure and non-secure data may comprise unciphered data and/or ciphered data, depending upon the indicated mode. The receiver provides the received selectively ciphered secure and non-secure data to the deciphering module 302. The deciphering module 302 acts to selectively decipher the received selectively ciphered secure and non-secure data to produce selectively deciphered data. The deciphering module 302 acts to output to the decoder 303 the selectively deciphered data. The decoder 303 acts to decode the selectively deciphered data.

Figure 4:
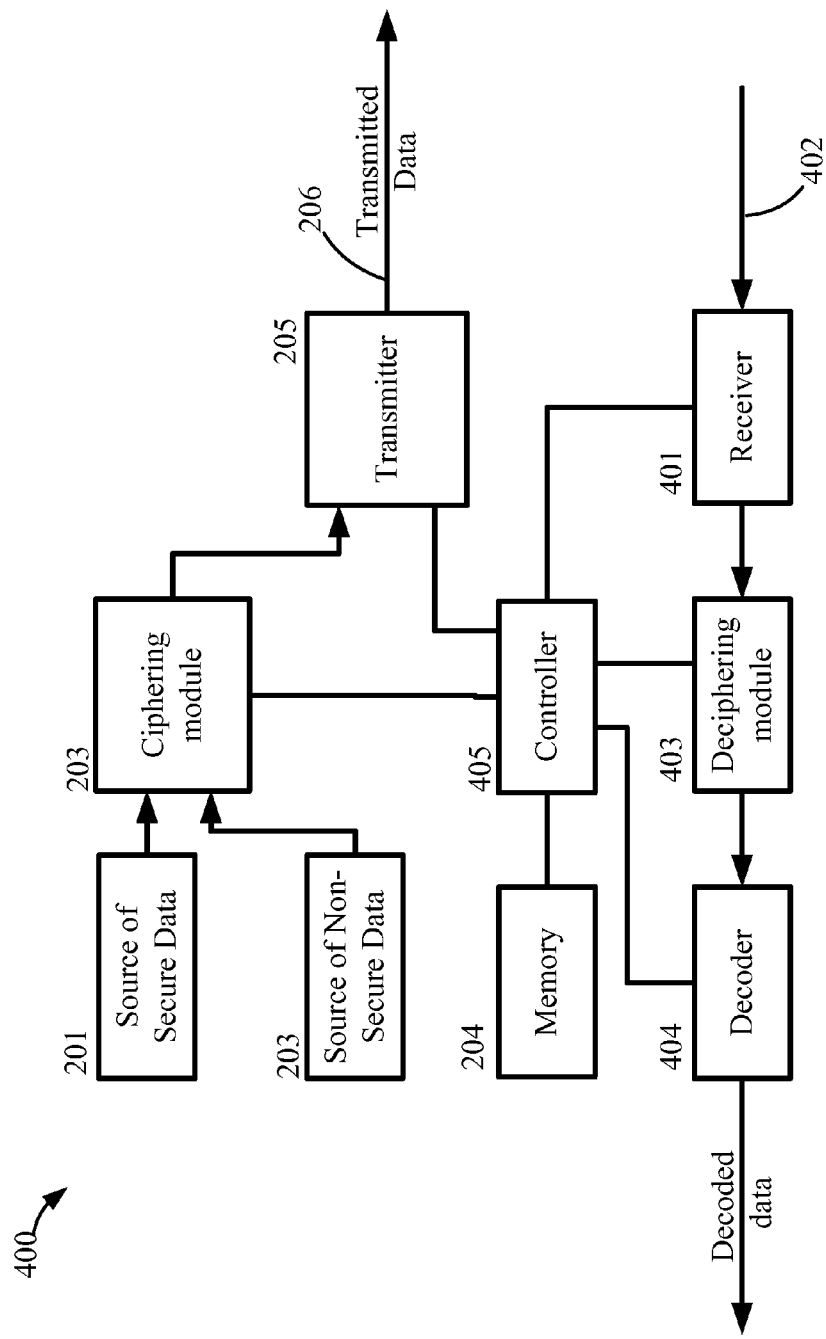
FIG. 4 is a schematic diagram of another network apparatus for use in a network of a wireless communication system according to some embodiments of the present invention.

FIG. 4 is a schematic diagram of another network apparatus 400 for use in a network of a wireless communication system. The network apparatus 400 may generally comprise a source of secure data 201, a source of non-secure data 202, a ciphering module 203, a memory 204 and a transmitter 205 which are identical to the corresponding elements shown in FIG. 2 and described above, and therefore need not be described again here.

The network apparatus 400 further comprises a receiver 401 to receive data signals. For example, a data signal 402 transmitted by a wireless terminal (e.g., the wireless terminal apparatus 300). The received data signal 402 may comprise ciphered and/or unciphered data and may comprise control data that may be ciphered on unciphered. A deciphering module 403, coupled to the receiver 401, acts to decipher ciphered data that is output by the receiver 401, to produce deciphered data. The deciphering module 403 also acts to output unciphered data that it receives, to produce unciphered data. A decoder 404 is coupled to the deciphering module 403 and acts to decode the deciphered data and the unciphered data to produce decoded data. The receiver 401, deciphering module 403 and the decoder 404 are controlled by a controller 405 according to instructions contained in the memory 204. The functions of the receiver 401, deciphering module 403 and the decoder 404 are substantially the same as the functions of elements 301-303 of FIG. 3 respectively. These functions allow the network apparatus 200 to receive, decipher and decode a data signal transmitted by a wireless terminal such as the wireless terminal 300.

Figure 5:
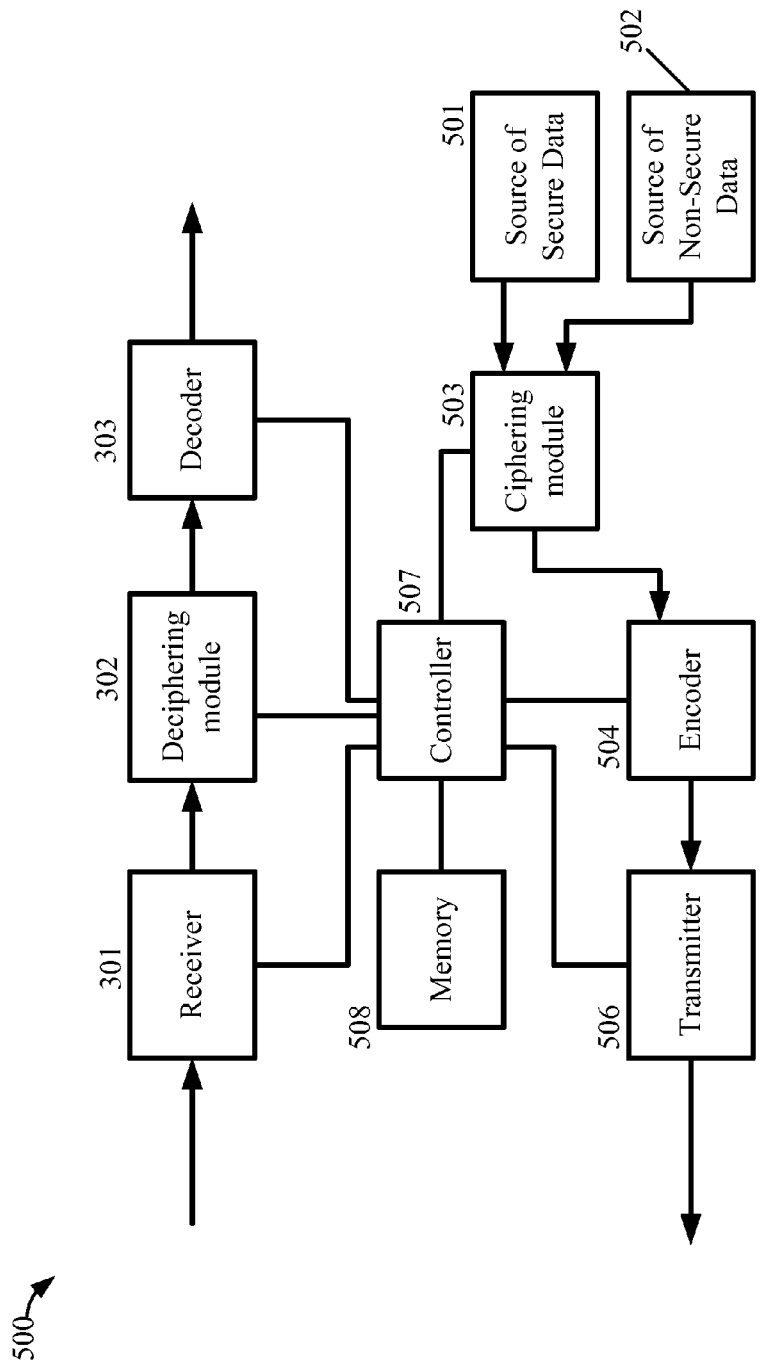
FIG. 5 is a schematic diagram of another wireless terminal apparatus of a wireless communication system according to some embodiments of the present invention.

FIG. 5 is a schematic diagram of another wireless terminal apparatus 500 of a wireless communication system. The wireless terminal apparatus 500 may generally comprise a receiver 301, a deciphering module 302, and a decoder 303. These three elements 301-303 correspond to the receiver 301, deciphering module 302 and decoder 303 of FIG. 3 respectively. In use, the receiver 301 receives an indication, transmitted by a network apparatus such as the network apparatus 400, indicating a ciphering mode in which secure data and non-secure data are selectively ciphered. The receiver 301 also receives selectively ciphered secure and non-secure data transmitted by the network apparatus.

The wireless terminal apparatus 500 further comprises a source of secure data 501, a source of non-secure data 502, and a ciphering module 503. These three elements 301-303 have functions substantially the same as the respective functions of elements 201-203 of FIG. 2. The ciphering module 503 provides selectively ciphered secure data and non-secure data to an encoder 504. The encoder 504 acts to encode the selectively ciphered secure data and non-secure data and provides encoded secure and non-secure data to a transmitter 506 which transmits the encoded secure and non-secure data.

The operations of the receiver 301, deciphering module 302, decoder 303, ciphering module 503, encoder 504 and transmitter 506 are controlled by a controller 507 by using instructions contained in a memory 508. The source of secure data 501, source of non-secure data 502, ciphering module 503, encoder 504 and transmitter 506 together enable the wireless terminal apparatus 500 to transmit a data signal comprising secure and non-secure data which a network apparatus may receive.

In use, the transmitter 506 may transmit a ready signal in response to an indication of a ciphering mode received by the receiver 301. The ready signal can be transmitted to another network component indicating that the apparatus 500 is capable of receiving ciphered/unciphered data. For example, the ready signal can serve to indicate that ciphering and deciphering abilities have been enabled in the wireless terminal 500. The ready signal serves to provide the indication that ciphering and deciphering have been enabled to the network apparatus 400 which transmitted the indication of the ciphering mode. In some embodiments, the transmitter 506 may transmit a ready signal in other fashions to the network apparatus 400 thereby alerting the network apparatus that the wireless terminal 500 has ciphering and deciphering abilities.

The various functions performed by the receiver 301, deciphering module 302, decoder 303, ciphering module 503, encoder 504 and transmitter 506 may be grouped in various ways. For example the ciphering module 503 and the encoder 504 may be part of the same circuit. The various functions may be all contained within a single processor circuit together with the memory 508.

Figure 6:
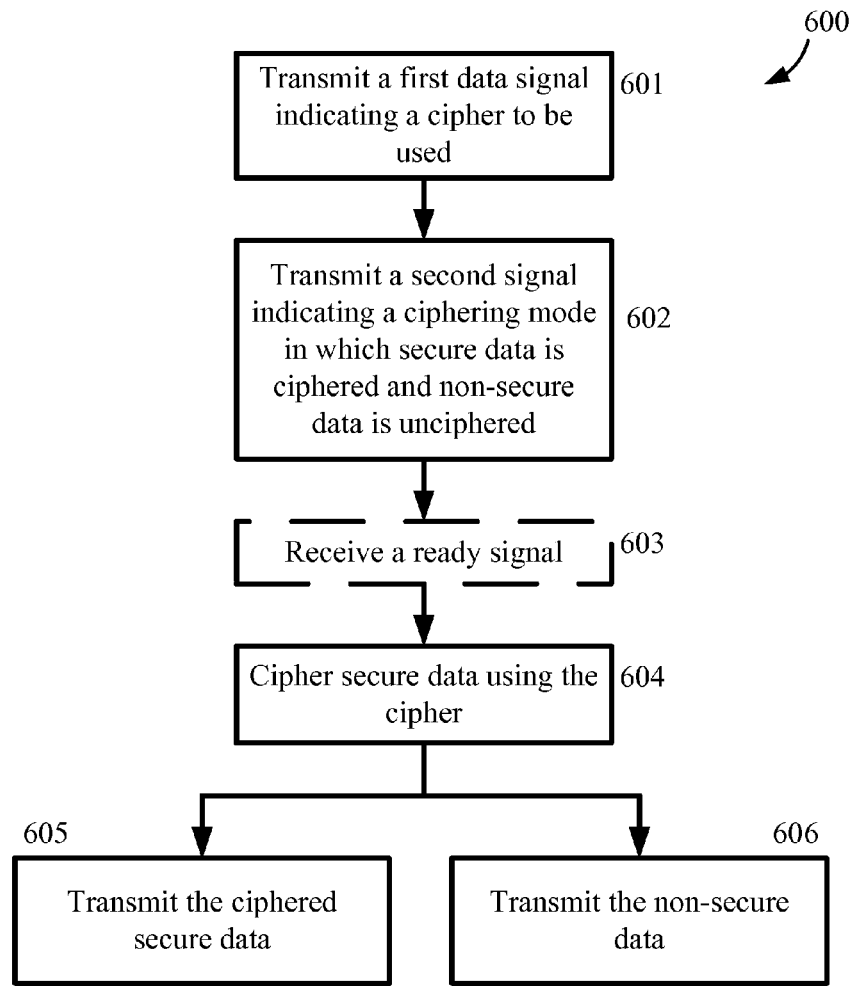
FIG. 6 is a flow diagram showing processing steps for transmitting secure and non-secure data according to some embodiments of the present invention.

FIG. 6 is a flow diagram 600 showing processing steps for transmitting secure and non-secure data. In block 601, a first data signal is transmitted by the network apparatus 400. The first data signal indicates a cipher to be used. The first data signal may comprise a message containing an indication. The message may include cipher mode information which defines whether ciphering shall be initiated and, if it is to be initiated, which ciphering algorithm (cipher) to use.

In block 602, a second data signal is transmitted by the network apparatus 400. The second data signal indicates one of a number of ciphering modes in which secure data and non-secure data are selectively ciphered. The indication of a ciphering mode is identical to the indication transmitted by the network apparatus 200, 400 and described above. The second data signal may comprise a message that contains the indication of the ciphering mode. The message may include cipher mode information defining which ciphering mode the network and the wireless terminal shall use. The first and second data signals may together be one data signal providing both the indication of a cipher to be used and the indication of a ciphering mode. Both indications may be contained in one message.

In block 603, optionally, a ready signal is received. The ready signal is transmitted by the wireless terminal apparatus 500. The ready signal is received by the network apparatus 400. The ready signal indicates that ciphering and deciphering have been enabled in the wireless terminal apparatus 500.

In block 604 secure data (e.g., speech data) is ciphered using the cipher indicated by the first data signal and using the ciphering mode indicated by the second data signal.

In the example embodiment of FIG. 6, the indicated ciphering mode is a mode in which secure data is ciphered and non-secure data is wholly unciphered. Therefore in block 604 only secure data is ciphered and non-secure data is not ciphered. Optionally, the ciphering performed in block 604 is dependent upon the network apparatus 400 receiving the ready signal in block 603, the ready signal transmitted by the wireless terminal apparatus 500. The non-secure data may optionally be partially ciphered. In blocks 605 and 606 the ciphered secure data and the non-secure data are transmitted.

The above description of examples and the associated drawings serve to show general principles of operation and general features that may be applied to many different types of wireless communication system. The following part of the description will describe how those general principles of operation and general features can be applied to a particular type of wireless communication system.

General Packet Radio System (GPRS) is a set of standards defining how packet data is transmitted and received in wireless communications systems complying with a set of telecommunication standards known as Global System for Mobile Communications (GSM). A further development of GPRS is a set of standards known collectively as Enhanced GPRS (EGPRS) otherwise known as Enhanced Digital GSM Evolution (EDGE). All these sets of standards are known collectively as GSM/EDGE Radio Access Network (GERAN) and are maintained by the standards-setting organization known as the Third Generation Partnership Project (3GPP). Encryption techniques for GERAN are defined in specification 3GPP TS 42.009 "3rd Generation Partnership Project; Technical Specification Group Services and Systems Aspects; Security Aspects (Release 4) version 4.1.0, published 23 Jun. 2006.

When a network of a GERAN system determines that a mobile station should start using ciphering, a network apparatus of the network (for example the network apparatus 400) transmits a data signal that comprises a CIPHERING MODE COMMAND message. The CIPHERING MODE COMMAND message comprises a radio resource management information element known as the CIPHER MODE SETTING information element (IE). The CIPHER MODE SETTING information element serves to indicate a cipher to be used and may indicate that no cipher is to be used (i.e., that data should be transmitted and received unciphered).

The CIPHERING MODE COMMAND message also comprises a radio resource management information element known as the CIPHER RESPONSE information element. Currently the CIPHER RESPONSE information element is an eight-bit octet which contains information defining a the cipher (bits 5, 6, and 7) and three unused or spare bits (bits 2, 3, and 4). Conveniently, two of these three spare bits can be used to indicate to the mobile station 123-127 a SACCH ciphering state to be used. This is achieved by modifying the CIPHER RESPONSE information element as illustrated in table 1 below.

An existing radio resource management information element may thus be easily adapted to include extra signalling which includes an indication that non-secure data is to be transmitted and received unciphered. Wireless terminals can be used that are capable of receiving and processing non-secure data which is wholly unciphered. Wireless terminals can be used that are capable of receiving non-secure data that is partly ciphered and partly unciphered. Additionally a wireless terminal may adjust its processing according to the mode in which the non-secure data is transmitted.

The indicated ciphering mode, alternatively termed a SACCH ciphering state, applies to both uplink SACCH and downlink SACCH data. The modified CIPHER RESPONSE IE octet may indicate that non-secure data is to be transmitted and received unciphered, as shown by the following table and the subsequent coding listing. Transmitting SACCH data unciphered is advantageous because SACCH data is repetitively transmitted non-secure data and so represents a particularly significant security risk when it is transmitted ciphered. However, SACCH data can sometimes include user data such as a short message service (SMS) data. When the SACCH data comprises user data, it may be advantageous to cipher the SACCH data so as to increase the security of the user data. However, the SACCH predominantly carries control data and it is advantageous to transmit control data unciphered since the control data is non-secure data.

TABLE 1

| 8 | 7 | 6 | 5 | 4 | 3 | 2 | 1 |
|---|---|---|---|---|---|---|---|
| CIPHER RESPONSE IEI | | | | 0 Spare | SACCH Cipher Mode | | CR |

The coding of bits 2 and 3 is as follows in Table 2:

TABLE 2

| Bits (3, 2) | SACCH Cipher Mode |
|---|---|
| 0 0 | SACCH uplink and downlink ciphering mode is set according to the CR field in the CIPHER RESPONSE IE. (This is the current or legacy behaviour.) |
| 0 1 | SACCH uplink and downlink data are always un-ciphered, regardless of the value of the CR field in the CIPHER RESPONSE IE |
| 1 0 | SACCH data shall be both un-ciphered and ciphered (if CR field in this message indicates Start Ciphering). This corresponds to a 'mixed mode' mobile station which blindly detects whether or not a cipher is used on the downlink. Data sent on the uplink is always ciphered. |
| 1 1 | Reserved |

As shown in the example coding listing above, when either bit 2 or bit 3 has binary value 1 and the other bit has value 0, the CIPHER RESPONSE information element octet serves to indicate that non-secure data is to be transmitted and received unciphered. When bit 2 has binary value 1, the CIPHER RESPONSE information element octet serves to indicate that all SACCH data is to be transmitted and received unciphered. When bit 3 has binary value 1, the octet serves to indicate that data is to be transmitted and received partly ciphered and partly unciphered.

An alternative method for the network apparatus 400 to provide an indication of a ciphering mode is to use system information messages. The network apparatus can transmit a System Information Type 3, System Information type 4 or system Information Type 6 message containing the indication (see 24.008 sections 9.1.35, 9.1.36 and 9.1.40 respectively). The indication can be provided as a 'SACCH cipher mode' field within the system information message in the SI3 Rest Octets, SI4 Rest Octets, or SI6 Rest Octets (see 3GPP TS 24.008 sections 10.5.2.34, 10.5.2.35, 10.5.2.35a respectively). An example coding listing is given below.

<L|H<SACCH Cipher Mode>

If the mobile station supports un-ciphered SACCH mode and the mobile station does not receive this SACCH cipher mode indication from the network then the mobile station shall assume the mixed mode for SACCH and shall act as if it has received 'SACCH Cipher Mode' set to '1 0' (see above).

If the mobile station performs inter-cell, intra-cell or inter-RAT handover to a new channel then the mobile station assumes 'SACCH Cipher Mode' is set to '1 0' until the mobile station receives this SACCH cipher mode indication on the new channel. Upon receiving this SACCH cipher mode indication the mobile station sets its SACCH cipher mode of operation according to the value in the SACCH cipher mode indication received from the network (see definition of SACCH Cipher Mode above).

Figure 7:
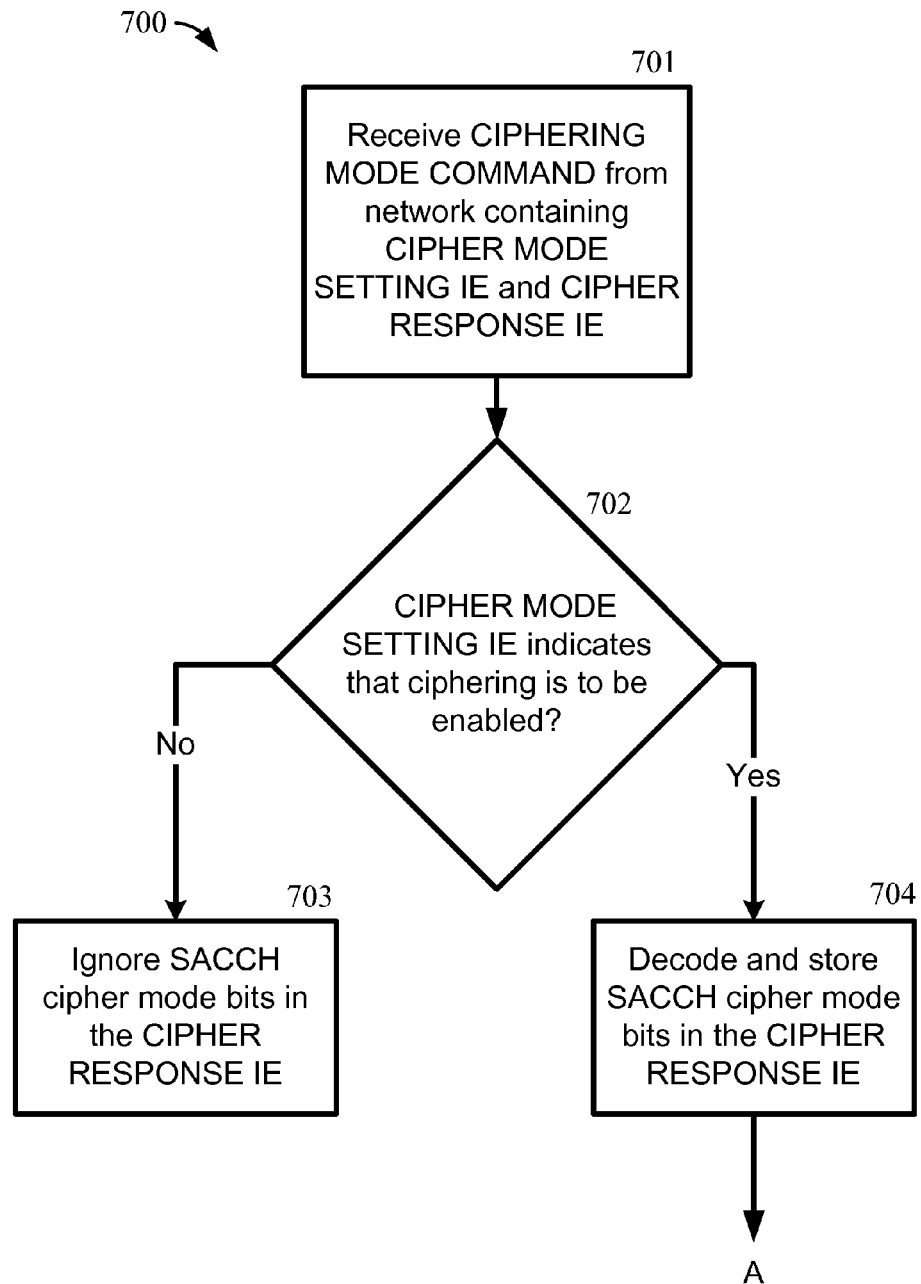
FIG. 7 is a flow diagram showing a first set of processing steps for receiving secure and non-secure data in a GERAN communication system according to some embodiments of the present invention.

FIG. 7 is a flow diagram showing a first set of processing steps 700 for receiving secure and non-secure data in a wireless terminal apparatus 500 of a GERAN communication system. In block 701, a CIPHERING MODE COMMAND is received by the wireless terminal apparatus 500, comprising a CIPHER MODE SETTING information element (IE) and a CIPHER RESPONSE information element.

In block 702, a determination is made in the wireless terminal apparatus 500 whether the CIPHER MODE SETTING information element indicates that ciphering is to be enabled for transmitting and receiving data.

If the determination in block 702 is NO (ciphering is not to be enabled for transmitting and receiving data), then in block 703 the SACCH cipher mode bits of the CIPHER RESPONSE information element may be ignored since they are not required.

If the determination is YES (ciphering is to be enabled for transmitting and receiving data), then in block 704 the SACCH cipher mode bits (bits 2 and 3) of the received CIPHER RESPONSE information element (described above and illustrated in the table below) are decoded and stored in a memory for use by the deciphering module 302 of the wireless terminal apparatus 500. Bits 5 to 7 of the CIPHER RESPONSE information element are decoded and used conventionally and serve to identify the information element.

| CIPHER RESPONSE information element contents | | | | | | | |
|---|---|---|---|---|---|---|---|
| 8 | 7 | 6 | 5 | 4 | 3 | 2 | 1 |
| | CIPHER RESPONSE IEI | | | 0 Spare | SACCH Cipher Mode | | CR |

The transmitter 506 of the wireless terminal apparatus 500 transmits a ready signal comprising a CIPHERING MODE COMPLETE message in response to the CIPHERING MODE COMMAND message received by the wireless terminal apparatus 500.

Figure 8:
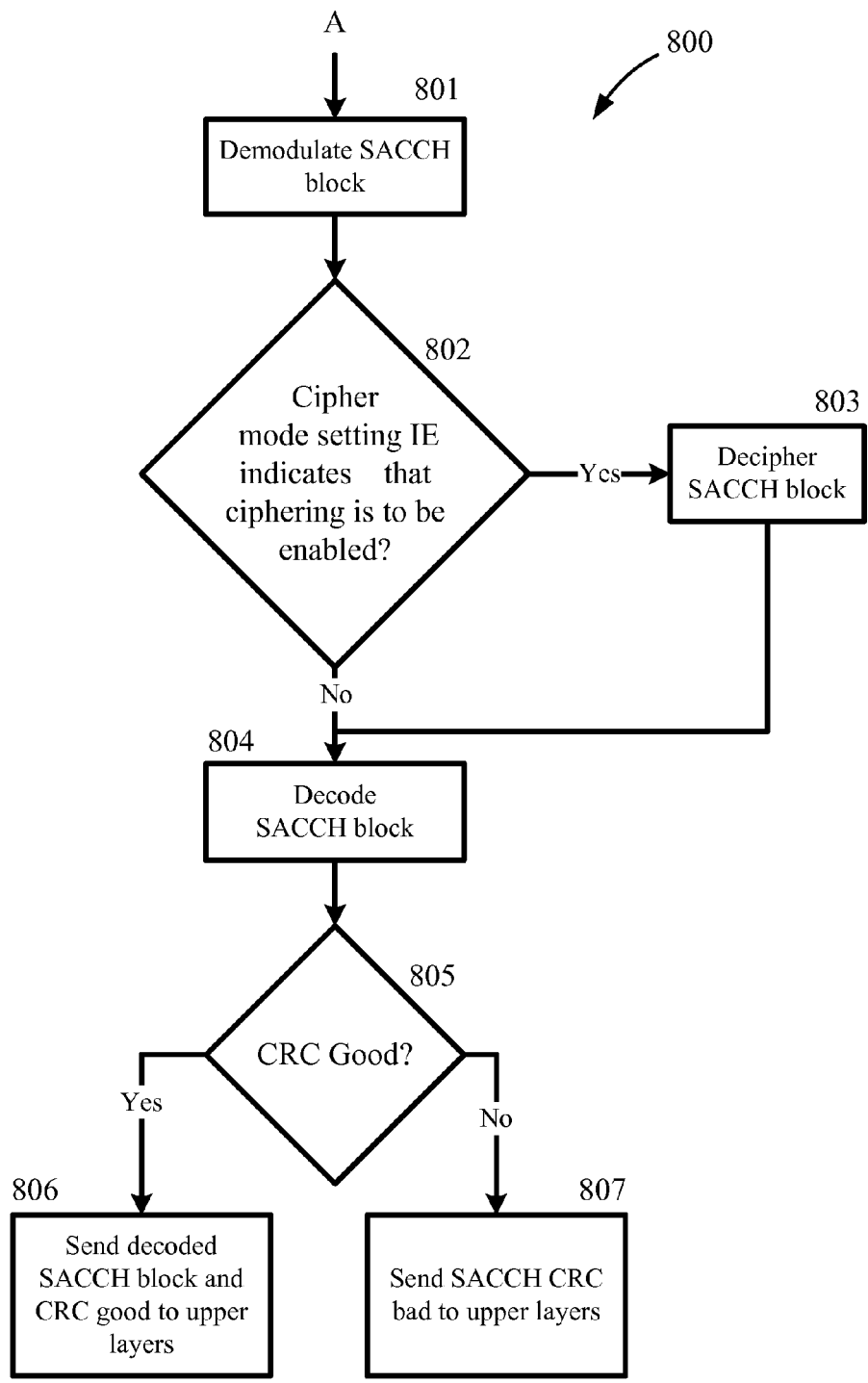
FIG. 8 is a flow diagram of a second set of processing steps for receiving secure and non-secure data in a GERAN communication system according to some embodiments of the present invention.

FIG. 8 is a flow diagram of a second set of processing steps 800 for receiving secure and non-secure data in a GERAN communication system. The first processing step, represented by block 801, follows the step 704 shown in FIG. 7, as indicated by reference sign "A" in each of FIGS. 7 and 8. In block 801 a block of received SACCH data is demodulated. SACCH data is a type of non-secure data. In block 802 a determination is made as to whether the received CIPHER MODE SETTING information element indicates that a cipher is to be used. The cipher mode setting information element indicates firstly whether or not a cipher is to be used and secondly, if a cipher is to be used, which cipher is to be used (see 3GPP TS 44.018, section 10.5.2.9).

If the determination in block 802 is YES, a cipher is to be used, then in block 803 the block of SACCH data is deciphered using the indicated cipher and in block 804 the deciphered SACCH block is decoded. If the determination in block 802 is NO, a cipher is not to be used, then in block 804 the SACCH block is decoded without having been deciphered. In block 805 a cyclic redundancy check (CRC) is performed on the decoded SACCH data. If the result of the CRC is good (YES), then in block 806 the decoded SACCH block is transmitted along with the CRC result to upper layers of the communication protocol. If the result of the CRC is not good (NO), then in block 807 the CRC result is transmitted to the upper layers and the SACCH data block is not transmitted to the upper layers. The received SACCH block is thus decoded whether or not it comprises ciphered data, and the SACCH block is selectively deciphered depending upon the received indication of the ciphering mode.

Figure 9:
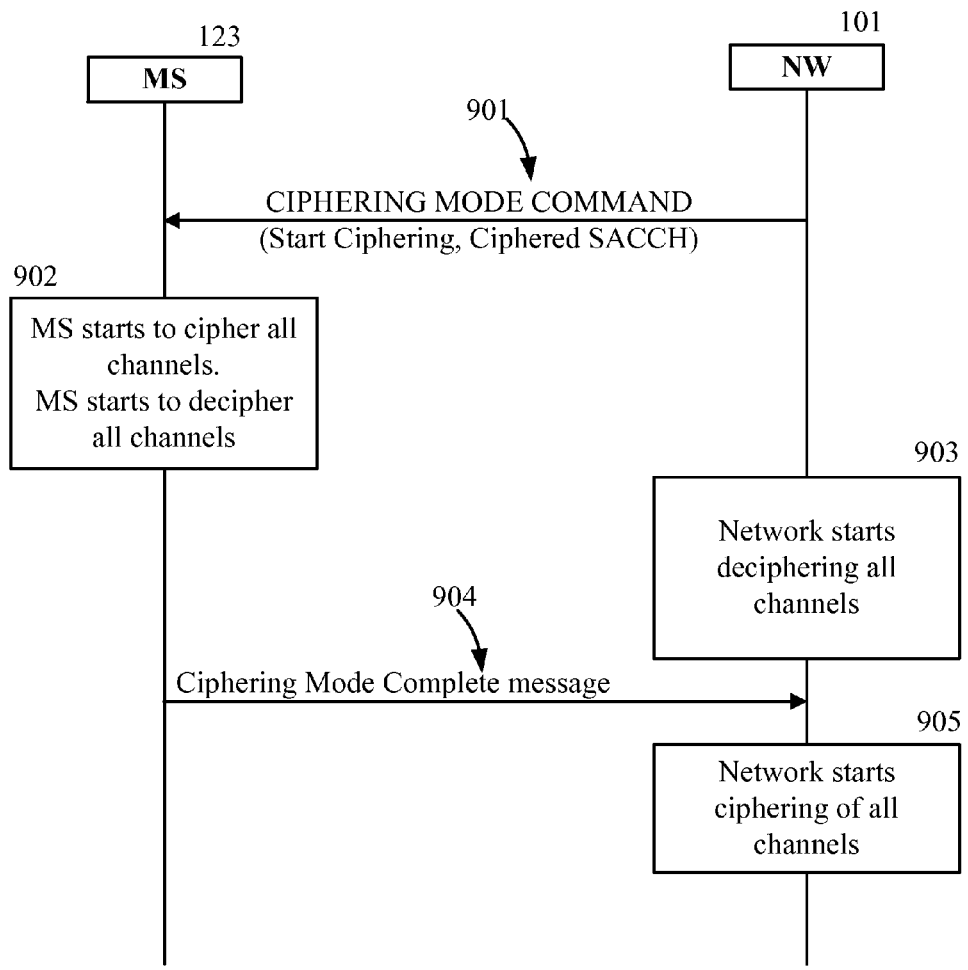
FIG. 9 is a sequence chart depicting behaviour of a network and a mobile station of a GERAN communication system when SACCH data transmitted by the network comprises ciphered information always during a transmission of data according to some embodiments of the present invention.

FIG. 9 is a sequence chart depicting behaviour of a network 101 and a mobile station 123 of a GERAN communication system when SACCH data transmitted by the network 101 comprises only ciphered data during a transmission of data. A ciphering mode command 901 is sent from a network 101 to a mobile station 123. In block 902, the mobile station 123 starts to cipher data that it transmits on all channels including a secure traffic channel and a non-secure SACCH channel. In block 903 the network starts deciphering data it receives on all channels including the secure traffic channel and the non-secure SACCH channel. The mobile station 123 sends a Ciphering Mode Complete message 904 to the network 101. In block 905 the network starts ciphering data that it transmits on all channels including the traffic channel and the SACCH channel.

Figure 10:
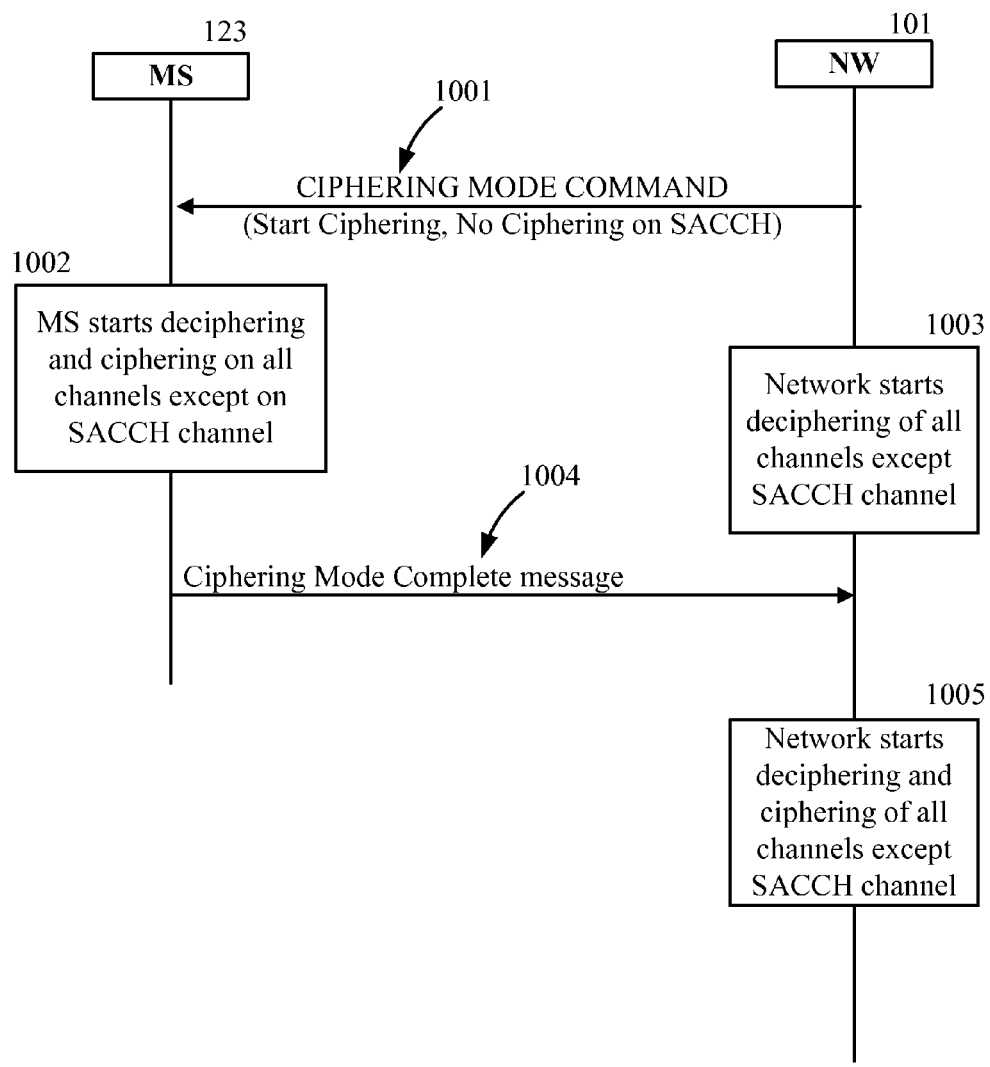
FIG. 10 is a sequence chart depicting behaviour a network and a mobile station of a GERAN communication system when SACCH data transmitted by the network comprises un-ciphered information always during a transmission of data according to some embodiments of the present invention.

FIG. 10 is a sequence chart depicting behaviour of a network 101 and a mobile station 123 of a GERAN communication system when SACCH data transmitted by the network 101 comprises only un-ciphered information during a transmission of data. A ciphering mode command 1001 is sent from the network 101 to the mobile station 123. In block 1002 the mobile station 123 starts deciphering and ciphering data that it transmits on all channels except the SACCH channel. In block 1003 the network 101 starts deciphering data that it receives on all channels except the SACCH channel. The mobile station 123 sends a Ciphering Mode Complete message 1004 to the network 101. In block 1005 the network starts deciphering and ciphering of data that it transmits and receives on channels other than the SACCH channel.

Figure 11:
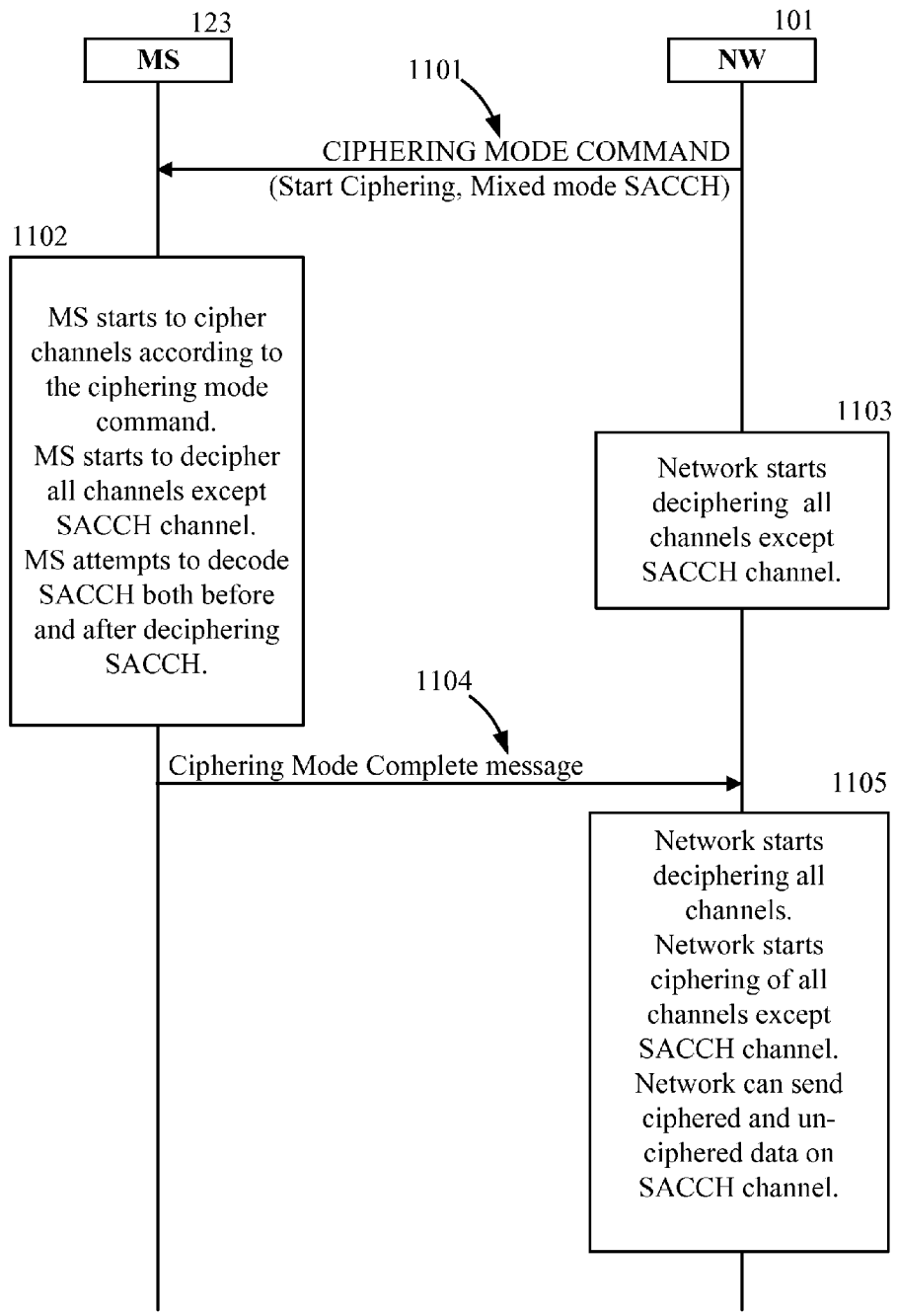
FIG. 11 is a sequence chart depicting behaviour of a network and a mobile station of a GERAN communication system when SACCH data transmitted by the network comprises both ciphered and un-ciphered information during a transmission of data according to some embodiments of the present invention.

FIG. 11 is a sequence chart depicting behaviour of a network 101 and a mobile station 123 of a GERAN communication system when SACCH data transmitted by the network 101 comprises both ciphered and un-ciphered non-secure data during a transmission of data. A ciphering mode command 1101 is sent from the network 101 to a mobile station 123. In block 1102 the mobile station 123-127 starts to selectively cipher data that it transmits and to selectively decipher data that it receives according to the ciphering mode command 1101. In block 1103 the network 101 starts deciphering data that it receives on all channels except the SACCH channel. The mobile station 123 sends a Ciphering Mode Complete message 1104 to the network 101 to indicate that the mobile station 123 has initiated ciphering and deciphering at the mobile station 123. In block 1105 the network 101 starts deciphering all channels. The network 101 also starts ciphering all channels except SACCH channel. The network 101 can optionally send ciphered and un-ciphered data on the SACCH channel.

The functions described herein may be implemented in hardware, software, firmware, or any combination thereof. The functions may be stored on a computer-readable medium or transmitted as one or more instructions or code over a computer-readable medium. Computer-readable media include any available medium that can be accessed by a computer or that facilitates transfer of a computer program or code in the form of instructions or data structures from one entity to another entity or from one place to another place. Computer-readable media include, but are not limited to, computer storage media, communication media, memory, optical storage, magnetic storage, or a connection. For example, if software is transmitted from a website, server, or other remote source using a connection, that connection is included in the definition of computer-readable medium and can include but is not limited to coaxial cable, fiber optic cable, twisted pair, digital subscriber line (DSL), or wireless technologies such as infrared, radio, and microwave. The terms disk and disc as used herein include compact disc (CD), laser disc, optical disc, digital versatile disc (DVD), floppy disk and blu-ray disc and may comprise any means for reproducing data magnetically or optically. Combinations of the above types of media should also be included within the scope of computer-readable media.

The above description is given by way of example only. Modifications and variations such as may occur to those possessed of appropriate knowledge and skills may be made without departure from the spirit and scope of the invention as set forth in the appended claims and equivalents thereof.

We claim:

1. A network apparatus in which secure and non-secure data may be transmitted in any one of a number of ciphering modes, the network apparatus comprising:
   a source of secure data;
   a source of non-secure data;
   a cipher controlled by a hardware controller to receive the secure data and the non-secure data and to perform ciphering in at least three slow associated control channel (SACCH) ciphering modes in which the secure data and the non-secure data are selectively ciphered, wherein the SACCH ciphering modes comprise a mode in which the secure data is ciphered and the non-secure data is partially ciphered, and wherein the mode is selected by the cipher based on user data that is determined to be at security risk; and
   a transmitter coupled to the cipher for transmitting an indication of the selected mode in which the secure and the non-secure data are selectively ciphered and transmitting the selectively ciphered secure data and non-secure data, wherein the indication of the SACCH ciphering mode is provided by at least two bits in a cipher response information element in a ciphering mode command message.

2. The network apparatus of claim 1, wherein the SACCH ciphering modes comprise a mode in which the secure data is ciphered and the non-secure data is wholly unciphered.

3. The network apparatus of claim 1, wherein the SACCH ciphering modes comprise a mode in which the secure data is ciphered and the non-secure data is wholly ciphered.

4. The network apparatus of claim 1, wherein the network apparatus is operable according to telecommunications standard entitled: mobile radio interface layer 3 specification 3GPP TS 44.018.

5. The network apparatus of claim 4, wherein the transmitter is configured to transmit a system control message on a dedicated common control channel (DCCH).

6. The network apparatus of claim 4, wherein the non-secure data is SACCH data.

7. The network apparatus of claim 1, wherein the receiver is configured to receive a system control message that comprises one of a System Information Type 3 message, a System Information Type 4 message and a system Information Type 6 message containing the indication.

8. The network apparatus of claim 7, wherein the indication is contained in a 'SACCH cipher mode' field within the system control message in one of the SI3 Rest Octets, SI4 Rest Octets, and SI6 Rest Octets of the system control message.

9. The network apparatus of claim 1, wherein:
   a first combination of values of the at least two bits indicates that the SACCH ciphering mode is set according to a separate field in the cipher response information element;
   a second combination of values of the at least two bits indicates that SACCH data are always unciphered, wherein the non-secure data is the SACCH data; and
   a third combination of values of the at least two bits indicates that the SACCH data are both unciphered and ciphered.

10. A wireless terminal apparatus in which secure and non-secure data may be received in any one of a number of different ciphering modes, the wireless terminal apparatus comprising:
    a receiver for receiving an indication of a slow associated control channel (SACCH) ciphering mode in which secure data and non-secure data are selectively ciphered and for receiving selectively ciphered secure and non-secure data, wherein the receiver is operable to receive the secure data and the non-secure data in any one of at least three SACCH ciphering modes, wherein the SACCH ciphering modes comprise a mode in which the secure data is ciphered and the non-secure data is partially ciphered, wherein the mode is selected based on user data that is determined to be at security risk, and wherein the indication of the SACCH ciphering mode is provided by at least two bits in a cipher response information element in a ciphering mode command message;
    a deciphering module coupled to the receiver and controlled by a hardware controller to selectively decipher the received selectively ciphered secure data and non-secure data according to the indicated SACCH ciphering mode to produce deciphered secure and non-secure data; and
    a decoder for decoding the deciphered secure and non-secure data.

11. The wireless terminal apparatus of claim 10, wherein the SACCH ciphering modes comprise a mode in which the secure data is ciphered and the non-secure data is wholly unciphered.

12. The wireless terminal apparatus of claim 10, wherein the SACCH ciphering modes comprise a mode in which the secure data is ciphered and the non-secure data is wholly ciphered.

13. The wireless terminal apparatus of claim 10, wherein the wireless terminal apparatus is operable according to telecommunications standard entitled: mobile radio interface layer 3 specification 3GPP TS 44.018.

14. The wireless terminal apparatus of claim 13, wherein the receiver is configured to receive a system control message on a dedicated common control channel (DCCH).

15. The wireless terminal apparatus of claim 13, wherein the non-secure data is SACCH data.

16. The wireless terminal apparatus of claim 10, wherein the secure data comprises control data.

17. A method in which secure and non-secure data may be transmitted in any one of a number of ciphering modes, the method comprising:
    providing, by a network apparatus, a source of secure data;
    providing, by the network apparatus, a source of non-secure data;
    receiving, at a cipher controlled by a hardware controller of the network apparatus, the secure data and the non-secure data, the cipher being configured to perform ciphering in at least three slow associated control channel (SACCH) ciphering modes in which the secure data and the non-secure data are selectively ciphered;
    selectively ciphering, by the cipher, the secure data and the non-secure data according to one of the at least three SACCH ciphering modes to produce selectively ciphered secure data and non-secure data, wherein the SACCH ciphering modes comprise a mode in which the secure data is ciphered and the non-secure data is partially ciphered, and wherein the mode is selected by the cipher based on user data that is determined to be at security risk;

transmitting, by the network apparatus, an indication of the selected mode in which the secure and the non-secure data are selectively ciphered, wherein the indication of the SACCH ciphering mode is provided by at least two bits in a cipher response information element in a ciphering mode command message; and transmitting, by the network apparatus, the selectively ciphered secure data and non-secure data.

18. The method of claim 17, wherein the SACCH ciphering modes comprise a mode in which the secure data is ciphered and the non-secure data is wholly unciphered.

19. The method of claim 17, wherein the SACCH ciphering modes comprise a mode in which the secure data is ciphered and the non-secure data is wholly ciphered.

20. The method of claim 17, wherein the method is according to telecommunications standard entitled: mobile radio interface layer 3 specification 3GPP TS 44.018.

21. The method of claim 20, further comprising transmitting a system control message on a dedicated common control channel (DCCH).

22. The method of claim 20, wherein the non-secure data is SACCH data.

23. A method of receiving secure and non-secure data in any one of a number of different ciphering modes, the method comprising:
receiving at a wireless terminal apparatus an indication of a slow associated control channel (SACCH) ciphering mode in which secure data and non-secure data are selectively ciphered, wherein the wireless terminal apparatus is operable to receive the secure data and the non-secure data in any one of at least three SACCH ciphering modes, wherein the SACCH ciphering modes comprise a mode in which the secure data is ciphered and the non-secure data is partially ciphered, wherein the mode is selected based on user data that is determined to be at security risk, and wherein the indication of the SACCH ciphering mode is provided by at least two bits in a cipher response information element in a ciphering mode command message;
receiving selectively ciphered secure and non-secure data to produce received selectively ciphered secure data and non-secure data;
selectively deciphering, by a deciphering module controlled by a hardware controller, the received selectively ciphered secure data and non-secure data according to the indicated SACCH ciphering mode to produce deciphered secure and non-secure data; and
decoding the deciphered secure and non-secure data.

24. The method of claim 23, wherein the SACCH ciphering modes comprise a mode in which the secure data is ciphered and the non-secure data is wholly unciphered.

25. The method of claim 23, wherein the SACCH ciphering modes comprise a mode in which the secure data is ciphered and the non-secure data is wholly ciphered.

26. The method of claim 23, wherein the method is according to telecommunications standard entitled: mobile radio interface layer 3 specification 3GPP TS 44.018.

27. The method of claim 26, further comprising receiving a system control message on a dedicated common control channel (DCCH).

28. The method of claim 26, wherein the non-secure data is SACCH data.

29. The method of claim 23, wherein the secure data comprises control data.

30. In a communication system comprising a plurality of wireless communication apparatuses configured to communicate with at least one other wireless communication apparatus, an apparatus comprising:
a cipher controlled by a hardware controller and configured to selectively determine a slow associated control channel (SACCH) ciphering mode in which secure and non-secure data are selectively ciphered, the cipher being configured to receive the secure and the non-secure data from one or more data sources, the cipher performing ciphering in at least three SACCH ciphering modes, wherein the SACCH ciphering modes comprise a mode in which the secure data is ciphered and the non-secure data is partially ciphered, and wherein the mode is selected by the cipher based on user data that is determined to be at security risk; and
a transmitter coupled to the cipher for transmitting an indication of the selected mode in which the secure and the non-secure data are selectively ciphered and transmitting the selectively ciphered secure data and non-secure data, wherein the indication of the SACCH ciphering mode is provided by at least two bits in a cipher response information element in a ciphering mode command message.

31. The apparatus of claim 30 further comprising a receiver configured to receive a ready signal and based on the ready signal transmitting the indication of the SACCH ciphering mode.

32. The apparatus of claim 30, wherein the apparatus is a mobile communication device or a network component of a wireless communication system.

33. In a communication system comprising a plurality of wireless communication apparatuses configured to communicate with at least one other wireless communication apparatus, an apparatus comprising:
a receiver for receiving an indication of a slow associated control channel (SACCH) ciphering mode in which secure data and non-secure data are selectively ciphered and for receiving selectively ciphered secure and non-secure data, wherein the receiver is operable to receive the secure data and the non-secure data in any one of at least three SACCH ciphering modes, wherein the SACCH ciphering modes comprise a mode in which the secure data is ciphered and the non-secure data is partially ciphered, wherein the mode is selected based on user data that is determined to be at security risk, and wherein the indication of the SACCH ciphering mode is provided by at least two bits in a cipher response information element in a ciphering mode command message; and
a deciphering module coupled to the receiver and controlled by a hardware controller to selectively decipher the received selectively ciphered secure data and non-secure data according to the indicated SACCH ciphering mode to produce deciphered secure and non-secure data.

34. The apparatus of claim 33, further comprising a transmitter configured to transmit a ready signal indicating that the apparatus can process the indication of the SACCH ciphering mode.

35. The apparatus of claim 33, wherein the apparatus is a mobile communication device or a network component of a wireless communication system.

* * * * *